United States Patent [19]

Cordrey et al.

[11] 4,152,283
[45] May 1, 1979

[54] RESTORING AGENT FOR SOFT CONTACT LENSES

[75] Inventors: Philip Cordrey, Bletchingly; Satindar N. Ganju, London, both of England

[73] Assignee: Sauflon International, Inc., Los Angeles, Calif.

[21] Appl. No.: 816,924

[22] Filed: Jul. 19, 1977

[30] Foreign Application Priority Data

Jul. 21, 1976 [GB] United Kingdom ............... 30445/76

[51] Int. Cl.² ............................................. C11D 7/38
[52] U.S. Cl. .................... 252/99; 204/159.22; 252/102; 252/546; 260/33.4 R; 351/160 H; 427/140
[58] Field of Search ............... 427/140; 252/546, 102, 252/99; 424/78; 260/33.4 R; 204/159.22; 351/160

[56] References Cited

U.S. PATENT DOCUMENTS

| | | | |
|---|---|---|---|
| 3,549,747 | 12/1970 | Krezanoski et al. | 424/78 |
| 3,822,089 | 7/1974 | Wichlerle | 260/33.4 R |
| 3,943,045 | 3/1976 | Cordrey et al. | 204/159.22 |

FOREIGN PATENT DOCUMENTS

123154  5/1971  United Kingdom.

*Primary Examiner*—Thomas J. Herbert, Jr.
*Attorney, Agent, or Firm*—Blanchard, Flynn, Thiel, Boutell & Tanis

[57] ABSTRACT

Soft contact lenses, which have become deteriorated as a result of prolonged use, are treated with an aqueous solution of ethylene oxide/propylene oxide block copolymer and ethylenediaminetetraacetic acid or water-soluble salt thereof.

10 Claims, No Drawings

RESTORING AGENT FOR SOFT CONTACT LENSES

This invention relates to the treatment of soft contact lenses for improving the optical and physical properties thereof.

Soft contact lenses, that is, contact lenses formed from hydrogels having a very high water content, are particularly susceptible to deterioration after prolonged use. Soft contact lenses are commercially available products which are made of hydrophilic polymers as described in, for example, U.S. Pat. No. Re. 27,401, 3,822,089, 3,943,045 and 4,032,599, the entire contents of which are incorporated herein by reference.

This deterioration occurs in relation to both the optical and the physical properties of the hydrogel. It is a characteristic property of deteriorated soft contact lenses that they exhibit a broad ultraviolet absorption not shown by new lenses, even to the extent of showing visible discoloration or staining. Such deteriorated contact lenses are liable to cause discomfort and irritation to the eyes when worn.

Hitherto, soft contact lenses which had deteriorated as herein described, were discarded because there was no known treatment effective to restore them to their original condition. This tendency to deteriorate, and ultimately the necessity of discarding deteriorated lenses, has seriously detracted from the appeal of soft contact lenses to contact lens wearers. Although soft lenses are particularly comfortable to wear, their use may involve the user in considerable expense for replacement lenses. This expense to some extent detracts from the commercial attractions of soft contact lenses.

It is an object of the present invention to provide a treatment, whereby soft contact lenses may be restored substantially to their original condition.

It is a further object of the invention to provide a composition which may be used by the soft lens wearer himself to restore his own lenses.

According to the invention there is provided a composition for treating soft contact lenses, said composition comprising an ethylene oxide/propylene oxide block copolymer and ethylenediaminetetracetic acid or water-soluble salt thereof, present in amounts effective to remove residues from the lenses and restore the physical and optical properties of the lenses substantially to their original new condition.

In this formulation the block copolymer preferably has two terminal hydroxyl groups.

Ethylene oxide/propylene oxide block copolymers are known nonionic surfactants having the general formula $HO(CH_2CH_2O)_a (C_3H_6O)_b (CH_2CH_2O)_cH$, wherein b is at least 15 and a and c are such that the polyoxyethylene units are from 20 to 90 percent of the total weight of the block copolymer. The molecular weight of the block copolymers varies from about 1100 to about 15000.

Ethylenediaminetetraacetic acid and water-soluble salts thereof can be used in the composition according to the present invention. As the salts there can be mentioned the mono-, di-, tri- and tetra-alkali metal salts, preferably sodium salts, and ethylenediaminetetraacetic acid disodium salt is especially preferred.

It has also been found particularly advantageous to include sodium perborate and/or sodium chloride in the composition.

The composition may be provided either in the form of a powder to be dissolved in water prior to use, or as an aqueous solution ready for use. When the formulation is provided in the form of a powder it is necessary to use a water-soluble ethylene oxide/propylene oxide block copolymer which is solid at ambient temperature (for example, Monolan E80); otherwise either a solid or a liquid (for example, Monolan E40) block copolymer may be used.

An embodiment of the composition according to the invention is a powder comprising from 50 to 80 wt.% of said block copolymer, from 1 to 5 wt.% of ethylenediaminetetraacetic acid and the balance is sodium perborate.

It is preferred to use a composition consisting of 70 wt.% of said block copolymer, 2 wt.% of ethylenediaminetetraacetic acid and 28 wt.% of sodium perborate.

A liquid composition according to the invention comprises an aqueous solution containing 20 to 60 wt.% of said block copolymer, 1 to 5% of ethylenediaminetetracetic acid, optionally containing from 10 to 30% of sodium perborate and/or from about 0.4 to 2% of sodium chloride, and the balance is essentially water.

It has been found that when sodium chloride is included in the formulation, the preferred embodiment consists of 50 wt.% of said block copolymer, 2 wt.% ethylenediaminetetracetic acid, 0.4 wt.% of sodium chloride and 47.6 wt.% of water.

Although the composition is particularly effective for restoring contact lenses made of hydrogels of polymers comprising N-vinyl pyrrolidone and methylmethacrylate with or without small amounts (up to 2%) of cross linking agents (sold under the Registered Trade Mark "Sauflon"), it is equally effective for restoring polyhydroxymethylmethacrylate soft contact lenses. Hydron, Weicon and Soflens soft contact lenses may also be successfully restored by this agent.

In order to restore a soft contact lens, it is soaked in an aqueous solution of the formulation, for a period determined by the degree of deterioration. In certain cases it may only be necessary to soak the lens overnight in order to restore the ultraviolet transparency of the lens. The treatment does not significantly alter the lens parameters other than restoring the ultraviolet transparency and enabling the lens to be worn comfortably again.

EXAMPLE

A soft contact lens, which has been worn and which exhibited a characteristic ultraviolet absorbance due to its being coated with lacrymal secretions and residues of agents used for daily cleaning of the lenses, is treated by soaking it overnight in an aqueous solution containing 35% of ethylene oxide/propylene oxide block copolymer (Monolan E 80), 1% of ethylenediaminetetraacetic acid and 14% of sodium perborate. The lens is then boiled in physiological saline solution for 30 minutes. The cleaned lens does not exhibit the original characteristic ultraviolet absorbance when tested in an ultraviolet spectrophotometer.

The embodiments of the invention in which an exclusive property or privilege is claimed are defined as follows:

1. A composition for treating deteriorated soft contact lenses to restore the physical and optical properties of the lenses substantially to their original new condition, in the form of a powder consisting essentially of (1) from 50 to 80 percent by weight of a water-soluble ethylene oxide/propylene oxide block copolymer nonionic surfactant which is solid at ambient temperature, said ethylene oxide/propylene oxide block copolymer having the formula $HO(CH_2CH_2O)_a(C_3H_6O)_b(CH_2CH_2O)_cH$, wherein b is at least 15 and the values of a and c are such that the —$CH_2CH_2O$—units comprise from 20 to 90 percent of the total weight of said block copolymer, said block copolymer having a molecular weight of about 1100 to about 15000, (2) from 1 to 5 percent by weight of ethylenediaminetetraacetic acid or water-soluble salt thereof, and (3) the balance is sodium perborate.

2. A composition as claimed in claim 1 in which said salts of ethylenediaminetetraacetic acid are the mono-, di-, tri- and tetra-alkali metal salts thereof.

3. A composition as claimed in claim 1 in which ingredient (2) is ethylenediaminetetraacetic acid disodium salt.

4. A composition as claimed in claim 1 in which the amount of ingredient (1) is 70 percent by weight, the amount of ingredient (2) is 2 percent by weight and the amount of ingredient (3) is 28 percent by weight.

5. A composition for treating deteriorated soft contact lenses to restore the physical and optical properties of the lenses substantially to their original new condition, in the form of an aqueous solution consisting essentially of (1) from 20 to 60 percent by weight of a water-soluble ethylene oxide/propylene oxide block copolymer nonionic surfactant, said ethylene oxide/propylene oxide block copolymer having the formula $HO(CH_2CH_2O)_a(C_3H_6O)_b(CH_2CH_2O)_cH$, wherein b is at least 15 and the values of a and c are such that the —$CH_2CH_2O$— units comprise from 20 to 90 percent of the total weight of said block copolymer, said block copolymer having a molecular weight of about 1100 to about 15000, (2) from 1 to 5 percent by weight of ethylenediaminetetraacetic acid or water-soluble salt thereof, (3) from 10 to 30 percent by weight of sodium perborate, and (4) the balance is water.

6. A composition as claimed in claim 5 in which said salts of ethylenediaminetetraacetic acid are the mono-, di-, tri- and tetra-alkali metal salts thereof.

7. A composition as claimed in claim 5 in which ingredient (2) is ethylenediaminetetraacetic acid disodium salt.

8. A composition for treating deteriorated soft contact lenses to restore the physical and optical properties of the lenses substantially to their original new condition, in the form of an aqueous solution consisting essentially of (1) from 20 to 60 percent by weight of a water-soluble ethylene oxide/propylene oxide block copolymer nonionic surfactant, said ethylene oxide/propylene oxide block copolymer having the formula $HO(CH_2CH_2O)_a(C_3H_6O)_b(CH_2CH_2O)_cH$, wherein b is at least 15 and the values of a and c are such that the —$CH_2CH_2O$— units comprise from 20 to 90 percent of the total weight of said block copolymer, said block copolymer having a molecular weight of about 1100 to about 15000, (2) from 1 to 5 percent by weight of ethylenediaminetetraacetic acid or water-soluble salt thereof, (3) from 10 to 30 percent by weight of sodium perborate, (4) from 0.4 to 2 percent by weight of sodium chloride, and (5) the balance is water.

9. A composition as claimed in claim 8 in which said salts of ethylenediaminetetraacetic acid are the mono-, di-, tri- and tetra-alkali metal salts thereof.

10. A composition as claimed in claim 8 in which ingredient (2) is ethylenediaminetetraacetic acid disodium salt.

* * * * *